(12) United States Patent
Kobayashi et al.

(10) Patent No.: US 6,263,855 B1
(45) Date of Patent: Jul. 24, 2001

(54) DIRECT FUEL INJECTION-TYPE SPARK-IGNITION INTERNAL COMBUSTION ENGINE

(75) Inventors: Tatsuo Kobayashi; Souichi Matushita; Toshimi Kashiwagura, all of Susono; Shizuo Abe, Aichi-ken; Fumiaki Hattori, Mishima; Taketoshi Fujikawa; Yoshihiro Nomura, both of Aichi, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/537,181

(22) Filed: Mar. 29, 2000

(30) Foreign Application Priority Data

Apr. 2, 1999 (JP) .................................................. 11-096689

(51) Int. Cl.⁷ ................................ F02B 17/00; F02B 3/02
(52) U.S. Cl. ............................ 123/295; 123/298; 123/305
(58) Field of Search ..................................... 123/295, 298, 123/305

(56) References Cited

U.S. PATENT DOCUMENTS

| | | | |
|---|---|---|---|
| 5,720,253 | * | 2/1998 | Matoba et al. ...................... 123/298 |
| 5,806,482 | * | 9/1998 | Igarashi et al. ...................... 123/305 |
| 5,915,353 | * | 6/1999 | Matsumara ........................... 123/305 |
| 6,035,822 | * | 3/2000 | Suzuki et al. ........................ 123/305 |
| 6,035,823 | * | 3/2000 | Koike et al. ......................... 123/298 |
| 6,125,817 | * | 10/2000 | Piock et al. .......................... 123/305 |
| 6,125,818 | * | 10/2000 | Okamoto et al. ..................... 123/305 |
| 6,186,113 | * | 2/2001 | Hattori et al. ........................ 123/298 |

FOREIGN PATENT DOCUMENTS 9-158736    6/1997   (JP).

* cited by examiner

*Primary Examiner*—Erick Solis
(74) *Attorney, Agent, or Firm*—Oliff & Berridge PLC

(57) ABSTRACT

A direct fuel injection-type spark-ignition internal combustion engine is disclosed. The engine comprises a spark plug, a fuel injector and a cavity formed on the top surface of the piston. The cavity has a bottom wall, a spark plug side wall and a fuel injector side wall. The fuel injector injects fuel toward the bottom wall of the cavity in stratified charge combustion. The fuel mainly proceeds toward the spark plug side wall of the cavity along the bottom wall, is deflected by the spark plug side wall and is led to the vicinity of the spark plug. In the engine, the fuel injector side wall of the cavity is provided with a deflecting portion. If a part of the injected fuel proceeds toward the fuel injector side wall along the bottom wall of the cavity, that part of the fuel is led to the vicinity of the spark plug by the deflecting portion.

5 Claims, 2 Drawing Sheets

DIRECT FUEL INJECTION-TYPE SPARK-IGNITION INTERNAL COMBUSTION ENGINE

BACKGROUND OF THE INVENTION

1. Field of the Invention

The present invention relates to a direct fuel injection-type spark-ignition internal combustion engine.

2. Description of the Related Art

There has heretofore been known the stratified charge combustion engine realized the directly injected fuel into a cylinder to form a mixture (hereinafter referred to as combustible mixture) that can be favorably ignited only in the vicinity of a spark plug, at the ignition timing, to burn a total lean mixture in the cylinder. To carry out stratified charge combustion, in general, the fuel injector injects fuel in the latter half period of the compression stroke. It is intended that the thus injected fuel proceeds into a concave cavity formed in the top of the piston, is vaporized by absorbing heat from the wall surfaces of the cavity, is deflected by the shape of the cavity toward the spark plug, and forms a combustible mixture near the spark plug.

In the direct fuel injection-type spark-ignition internal combustion engine for performing the stratified charge combustion, in general, the spark plug is arranged nearly at the center in the upper part of the cylinder, and the fuel injector is arranged in the periphery in the upper part of the cylinder. The piston cavity is located from nearly the central portion of the top surface of the piston to the periphery of the top surface of the piston on the side of the fuel injector. The piston cavity has a bottom wall and side walls which are spark plug side and fuel injector side. Fuel injected into the cavity collides with the bottom wall of the cavity, thereafter proceeds toward the spark plug side wall along the bottom wall, and is deflected toward the spark plug by the spark plug side wall.

In order to promote the fuel vaporization utilizing the heat of the wall surface of the cavity, the distance for moving fuel along the wall surface of the cavity must be lengthened so that the injected fuel stays in contact with the wall surface of the cavity for an extended period. In order to realize this without changing the shape of the cavity, it has been proposed to inject fuel at a relatively large acute angle with respect to the bottom wall of the cavity. This makes it possible to bring the position where fuel collides with the bottom wall away from the spark plug side wall of the cavity, maintaining the same injector hole position, compared with when the fuel is injected at a relatively small acute angle, and, hence, to extend the distance for moving fuel along the bottom wall of the cavity.

When the fuel is injected at a relatively large acute angle with respect to the bottom wall of the cavity, however, fuel which has collided with the bottom surface is diverted and all of the fuel does not proceed toward the spark plug side wall along the bottom surface; i.e., a part of the fuel proceeds toward the fuel injector side wall along the bottom surface.

Accordingly, the quantity of the combustible mixture formed near the spark plug via the spark plug side wall of the cavity is decreased, so that the engine output is also decreased. Furthermore, the mixture formed by fuel proceeded toward the fuel injector side wall of the cavity cannot be favorably burned, and unburned fuel may be emitted in increased amounts.

SUMMARY OF THE INVENTION

The objective of the present invention is to provide a direct fuel injection spark-ignition internal combustion engine which produces the engine output as intended in the stratified charge combustion mode; in this engine, fuel is injected toward the bottom wall of a cavity formed in the top surface of a piston so as to proceed mainly toward the spark plug side wall of the cavity along the bottom wall, and the fuel is led toward the vicinity of the spark plug and in which, even when the fuel that has collided with the wall surface of the cavity is diverted into toward the spark plug side wall of the cavity and toward the fuel injector side wall, all of the injected fuel is burned as the combustible mixture.

According to the present invention, provided is a direct fuel injection-type spark-ignition internal combustion engine comprising a spark plug, a fuel injector and a cavity formed in the top surface of the piston, the cavity having a bottom wall, a spark plug side wall and a fuel injector side wall, the fuel injector injecting fuel toward the bottom wall of the cavity in stratified charge combustion, the fuel mainly proceeding toward the spark plug side wall of the cavity along the bottom wall, being deflected by the spark plug side wall and being led to the vicinity of the spark plug, wherein the fuel injector side wall of the cavity is provided with a deflecting portion, and if a part of the injected fuel proceeds toward the fuel injector side wall along the bottom wall of the cavity, the part of the fuel is led to the vicinity of the spark plug by the deflecting portion.

The present invention will be more fully understood from the description of preferred embodiments of the invention set forth below together with the accompanying drawings.

DESCRIPTION OF THE PREFERRED EMBODIMENT

Figure 1:
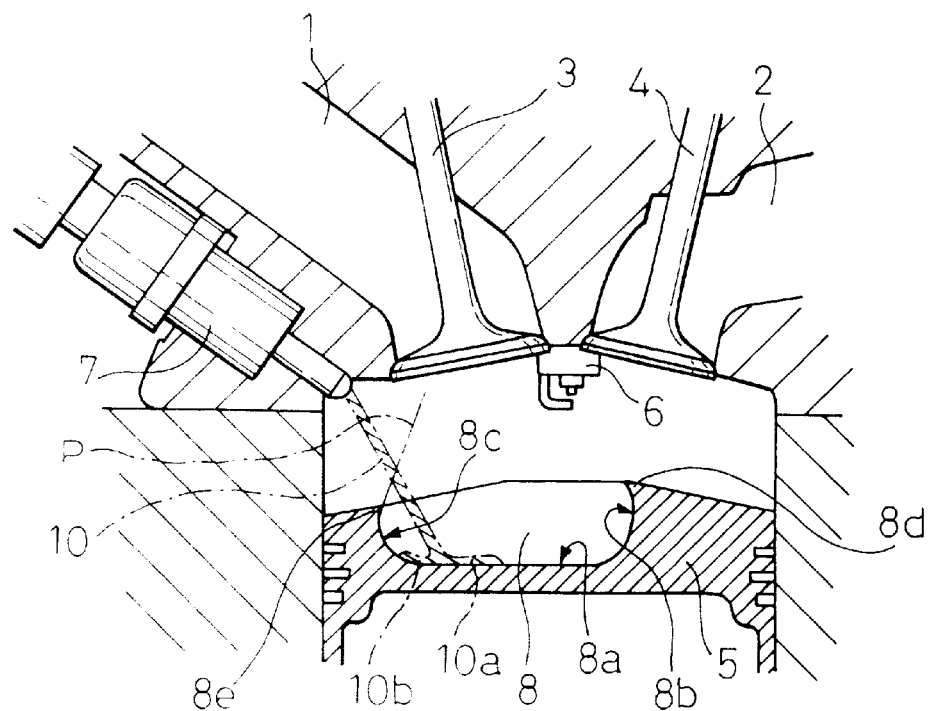
FIG. 1 is a vertical sectional view schematically illustrating a direct fuel injection-type spark-ignition internal combustion engine according to an embodiment of the present invention.
Figure 2:
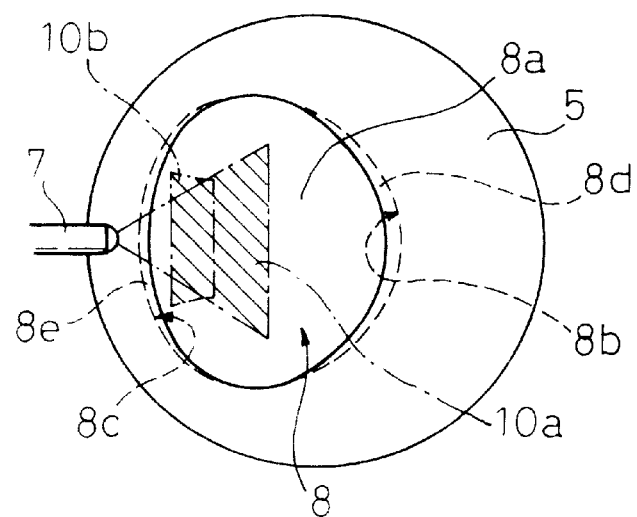
FIG. 2 is a plan view of a piston of FIG. 1.

FIG. 1 is a vertical sectional view schematically illustrating a direct fuel injection-type spark-ignition internal combustion engine according to a first embodiment of the present invention, and FIG. 2 is a plan view of a piston in FIG. 1. In these drawings, reference numeral 1 denotes an intake port and 2 denotes an exhaust port. The intake port 1 connects to the cylinder via an intake valve 3, and the exhaust port 2 connects to the cylinder via an exhaust valve 4. Reference numeral 5 denotes a piston having a cavity 8 formed in the top surface thereof, and 6 denotes a spark plug arranged near to the central upper part of the cylinder.

A fuel injector 7 is arranged in the periphery of the upper part of the cylinder on the side of the intake port 1 and injects fuel whose spray pattern is flat fan shape with a relatively small thickness. The cavity 8 is formed in the top surface of the piston, and located from near the central portion of the piston to the periphery of the piston on the side of the fuel injector. The cavity has a bottom wall 8a, a spark plug side wall 8b and a fuel injector side wall 8c. The spark plug 6 is positioned on the center line of the contained angle of the fan of the fan-shaped spray injected from the fuel injector 7, and faces the inside of the spark plug side wall 8b of the cavity 8.

For example, in a uniform charge combustion region where a high engine output is required, the fuel injector 7 injects a required amount of fuel in the intake stroke thereby to form a uniform charge mixture in the cylinder at the ignition timing. On the other hand, in a stratified charge combustion region, a required amount of fuel is injected into the cavity 8 in the latter half of the compression stroke. Fuel injected into the cavity 8 collides with the bottom wall 8*a* of the cavity 8 so as to proceed toward the spark plug side wall 8*b* along the bottom wall 8*a*. Fuel proceeding on the bottom wall 8*a* radially spreads within the contained angle of the fan of fuel, and is gradually vaporized by favorably absorbing heat from a wide area of the wall surface of the cavity.

In addition to being smoothly connected to the bottom wall 8*a*, the spark plug side wall 8*b* of the cavity 8 has an arcuate shape in a plan view. Further, the distance from the center of the contained angle of the fan of fuel proceeding on the bottom wall 8*a* of the cavity to the spark plug side wall, is larger than the radius of the arcuate shape of the cavity. Therefore, each part of fuel in the width direction arriving at the spark plug side wall 8*b* does not lose much speed, and proceeds along the spark plug side wall 8*b*, gains an upward velocity component and further gains a velocity component in the direction of center line of the contained angle of the fan of fuel as fuel comes into collision with the spark plug side wall 8*b* at an acute angle in a plan view. Further, the spark plug side wall 8*b* is provided with a first deflecting portion 8*d*. Therefore, each part of fuel proceeding along the spark plug side wall 8*b* is finally deflected toward the inside of the cavity 8.

Thus, if all of the injected fuel proceeds toward the spark plug side wall 8*b* along the bottom wall 8*a* of the cavity 8 and is finally completely vaporized on the spark plug side wall 8*b*, then a combustible mixture is formed near the spark plug at the ignition timing, and favorable stratified charge combustion can be realized.

In order to realize the favorable stratified charge combustion, first, it is important that all of the injected fuel is completely vaporized at the ignition timing. If a part of the fuel exists as liquid, it does not favorably burn and is exhausted as unburned fuel. In the present embodiment, the distance for moving fuel along the wall surface of the cavity is lengthened and the injected fuel is permitted to stay in contact with the wall surface of the cavity for an extended period in order to promote the vaporization of the fuel utilizing the heat of the wall surface of the cavity. Concretely speaking, the fuel injector 7 injects fuel at a relatively large acute angle with respect to the bottom wall 8*a* of the cavity 8, whereby the position where fuel collides the bottom wall 8*a* is moved away from the spark plug side wall 8*b* of the cavity 8, making it possible to lengthen the distance for moving fuel on the bottom wall 8*a* of the cavity 8.

However, when fuel 10 is injected at a relatively large acute angle with respect to the bottom wall 8*b* of the cavity 8, as shown in FIGS. 1 and 2, the fuel that has come into collision with the bottom wall 8*a* is diverted into a fuel 10*a* proceeding toward the spark plug side wall 8*b* along the bottom wall 8*a* and a fuel 10*b* proceeding toward the fuel injector side wall 8*c* along the bottom wall 8*a*.

From the standpoint of quantity, a large proportion of fuel 10*a* proceeds toward the spark plug side wall 8*b* and a small proportion of fuel 10*b* proceeds toward the fuel injector side wall 8*c*. In stratified charge combustion, only a minimum required amount of fuel is injected in the present engine operating condition. Therefore, if a part of the injected fuel does not appear as a mixture near the spark plug 6, the engine output is not produced as intended. Besides, a part of the fuel is not favorably burned despite it being vaporized at the ignition timing, and it may be emitted as unburned fuel.

In the present embodiment, the fuel injector side wall 8*c* of the cavity 8 is provided with a second deflecting portion 8*e* for deflecting fuel toward the inside of the cavity 8. Therefore, even if a part of the injected fuel proceeds toward the fuel injector side wall 8*c* of the cavity 8 along the bottom wall 8*a*, this fuel is gradually vaporized by absorbing heat from the bottom wall 8*a* of the cavity 8 and from the fuel injector side wall 8*c*, and is imparted with an upward velocity component due to the fuel injector side wall 8*c* and is further deflected toward the inside of the cavity 8 by the second deflecting portion 8*e*.

Figure 3:
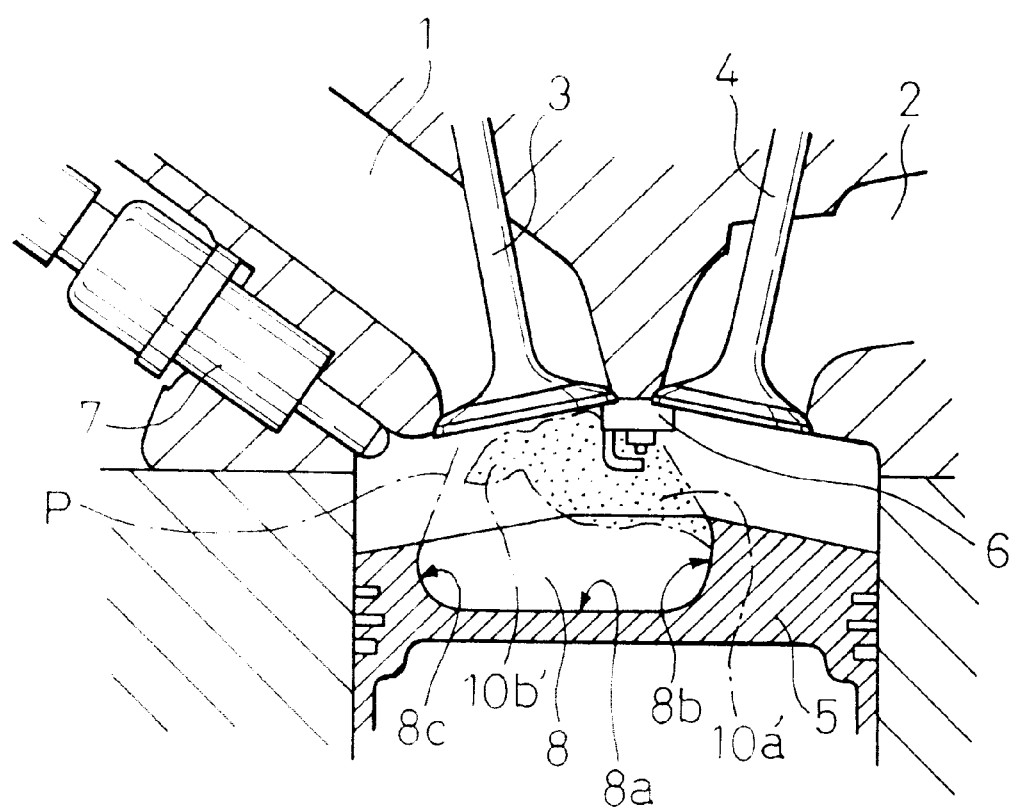
FIG. 3 is a view corresponding to FIG. 1 at the ignition timing.

At the ignition timing, as shown in FIG. 3, therefore, the mixture 10*b*' formed by fuel proceeding toward the fuel injector side wall 8*c* of the cavity 8 moves toward the spark plug 6 by use of the pentroof shape in the upper part of the cylinder, and merges with the mixture 10*a*' formed near the spark plug, due to fuel proceeding toward the spark plug side wall 8*b*, thereby to form a mass of combustible mixture, and thus favorable stratified charge combustion can be realized to produce the engine output as intended.

The second deflecting portion 8*e* may be an inclined surface or an arcuate surface if it is capable of deflecting the fuel proceeding on the fuel injector side wall 8*c* of the cavity 8 toward the inside of the cavity 8. If the angle of the extended plane of the second deflecting portion 8*e* (when the second deflecting portion 8*e* is an arcuate surface, the plane extending in the tangential direction of the end thereof) with respect to the horizontal plane is selected to be relatively small, the mixture 10*b*' formed by fuel proceeding on the fuel injector side wall 8*c* of the cavity 8 can be directly merged with the mixture 10*a* near the spark plug without employing the pentroof shape in the upper part of the cylinder.

Further, as shown in FIGS. 1 and 3, at a piston position in the latter half of the compression stroke, the extended plane (P) of the second deflecting portion Be near the injection hole of the fuel injector 7 does not come into contact with the injection hole of the fuel injector 7, and the injection hole of the fuel injector 7 is positioned on the outer side of the extended plane (P).

Therefore, even if fuel in the form of a liquid proceeds on the fuel injector side wall 8*c* of the cavity 8, the liquid fuel does not stick to the injection hole of the fuel injector 7 and does not form a deposit. This eliminates the problem in that the deposit is formed on the injection hole of the fuel injector 7 causing the fuel to be injected in a decreased amount per a unit time by the fuel injector 7.

Further, if the fuel injector side wall 8*c* of the cavity 8 has an arcuate portion in a plan view and if the distance from the center of the contained angle of the fan of fuel proceeding toward the fuel injector side wall 8*c* along the bottom wall 8*a* of the cavity to the fuel injector side wall 8*c* is set to be larger than the radius of the arcuate portion of the fuel injector side wall 8*c* of the cavity, fuel proceeding toward the fuel injector side wall 8*c* can converge in the direction of center line of the contained angle of the fan of fuel as the spark plug side wall 8*b*, and the mixture formed by this fuel can be comfirmly led toward the spark plug 6.

In uniform charge combustion in which fuel is injected during the intake stroke, fuel injection amount becomes larger than that in stratified charge combustion since the engine load is high. In order to inject this large amount of fuel during the intake stroke, the fuel injection must be started from the initial stage of the intake stroke. In uniform charge combustion, the injected fuel is diverted as it comes into collision with the bottom wall 8*a* of the cavity 8 so as to be widely dispersed in the cylinder, offering an advantage from the standpoint of forming a favorable uniform mixture at the ignition timing.

If fuel proceeds in large amounts toward the spark plug side wall 8b of the cavity 8 only, fuel tends to remain in a liquid form near the boundary between the bottom wall 8a of the cavity 8 and the spark plug side wall 8b. The liquid fuel may not have been sufficiently vaporized at the ignition timing and may be emitted as unburned fuel. Fuel is diverted so as to proceed toward the fuel injector side wall 8c of the cavity 8, whereby fuel proceeds in a decreased amount toward the spark plug side wall 8b to solve the above problem. According to the present embodiment as described above, the problem caused by diversion of fuel in stratified charge combustion is solved, furthermore, diversion of fuel can be positively utilized for uniform charge combustion.

In the present embodiment, the fuel injector 7 injects fuel in a flat fan shape having a relatively small thickness, however, this is not to limit the invention. The above-mentioned effects can be obtained even when fuel is injected in a conical shape or in a cylindrical shape, the fuel injector side wall 8c of the cavity 8 is provided with the above-mentioned second deflecting portion 8e and the fuel is diverted due to the collision with the bottom wall of the cavity.

What is claimed is:

1. A direct fuel injection-type spark-ignition internal combustion engine comprising a spark plug, a fuel injector and a cavity formed on the top surface of the piston, said cavity having a bottom wall, a spark plug side wall and a fuel injector side wall, said fuel injector injecting fuel toward said bottom wall of said cavity in stratified charge combustion, said fuel mainly proceeding toward said spark plug side wall of said cavity along said bottom wall, being deflected by said spark plug side wall and being led to the vicinity of said spark plug, wherein said fuel injector side wall of said cavity is provided with a deflecting portion, and if a part of the injected fuel proceeds toward said fuel injector side wall along said bottom wall of said cavity, said part of the fuel is led to the vicinity of said spark plug by said deflecting portion.

2. A direct fuel injection-type spark-ignition internal combustion engine according to claim 1, wherein the injection hole of said fuel injector is positioned on the outer side of an extended plane of said deflecting portion near said injection hole of said fuel injector without contacting said extended plane at a piston position in the latter half of the compression stroke.

3. A direct fuel injection-type spark-ignition internal combustion engine according to claim 1, wherein said fuel injector injects fuel in the shape of a flat fan having a relatively small thickness.

4. A direct fuel injection-type spark-ignition internal combustion engine according to claim 1, wherein said spark plug side wall of said cavity has an arcuate portion in a plan view, and a distance from the injection hole of said fuel injector to said spark plug side wall in a plan view is larger than the radius of said arcuate portion.

5. A direct fuel injection-type spark-ignition internal combustion engine according to claim 3, wherein said fuel injector side wall of said cavity has an arcuate portion in a plan view, and a distance from the center of the contained angle of said fan shape of fuel proceeding toward said fuel injector side wall along said bottom wall of said cavity to said fuel injector side wall is larger than the radius of said arcuate portion.

* * * * *